United States Patent [19]

Walker

[11] Patent Number: 4,945,860
[45] Date of Patent: Aug. 7, 1990

[54] STOCK HANDLING DEVICE

[76] Inventor: Peter C. Walker, "Murra Murra", East Mail Run, Esperance, W.A. 6450, Australia

[21] Appl. No.: 266,628
[22] PCT Filed: Dec. 16, 1987
[86] PCT No.: PCT/AU87/00425
§ 371 Date: Aug. 15, 1988
§ 102(e) Date: Aug. 15, 1988
[87] PCT Pub. No.: WO88/04523
PCT Pub. Date: Jun. 30, 1988

[30] Foreign Application Priority Data

Dec. 16, 1986 [AU] Australia ............... PH9529

[51] Int. Cl.⁵ .............................................. A01K 15/00
[52] U.S. Cl. .......................................... 119/108; 119/142
[58] Field of Search ....................... 119/1, 29, 96, 108, 119/129, 142; 54/71; 340/473

[56] References Cited

U.S. PATENT DOCUMENTS

| 464,854 | 12/1891 | Christesen | 119/108 |
|---|---|---|---|
| 487,461 | 12/1892 | Whitefield | 119/108 |
| 2,177,789 | 10/1939 | Sacker | 119/142 |
| 2,212,160 | 8/1940 | Kelly | 119/142 |
| 2,263,503 | 11/1941 | Kennedy | 119/142 |
| 2,566,437 | 9/1951 | Warmann | 119/142 |
| 2,741,224 | 4/1956 | Putnam | 119/29 |
| 2,940,425 | 6/1960 | Dykens | 119/129 |
| 2,996,043 | 8/1961 | Pettingill | 119/29 |
| 3,509,693 | 5/1970 | French | 119/29 |
| 3,687,112 | 8/1972 | Henderson | 119/29 |
| 4,535,724 | 8/1985 | David | 54/71 X |
| 4,551,713 | 11/1985 | Aossey | 340/573 X |
| 4,583,493 | 4/1986 | Terry | 54/71 X |

FOREIGN PATENT DOCUMENTS

| 2800705 | 7/1979 | Fed. Rep. of Germany | 119/108 |
|---|---|---|---|
| 17814 | 8/1904 | United Kingdom | 119/108 |

Primary Examiner—Paul J. Hirsch
Attorney, Agent, or Firm—Bruce L. Adams; Van C. Wilks

[57] ABSTRACT

A stock handling device having a shock unit (5) and means to attach the unit to the animal, said shock unit being arranged to deter the animal when it pushes against an object, having a pressure switch (6) on the head of an animal and a shock unit connected to contact pads (2,4) engageable on the animal in spaced relationship, whereby to apply a deterrent shock to the animal through the contact pads when the pressure switch is actuated.

11 Claims, 3 Drawing Sheets

STOCK HANDLING DEVICE

BACKGROUND OF THE INVENTION

This invention relates to a stock handling device and in particular it relates to a device which can be fitted to the head of an animal such as a bull to provide a means of discouraging the animal from butting, such as during fighting or pushing, aganist gates, fences or the like.

It is already known to use devices in the handling of animals which use an electrical shock acting on the body of the animal such as for instance electric fences which are installed so that when an animal touches the fence it receives a shock which discourages it from attempts to break through the fence.

SUMMARY OF THE INVENTION

The present invention however has as its object a restraining device which is carried by the animal itself in a position to apply a shock to the animal when it uses its head either during a fight or when pushing against objects to break through a fence or the like and according to this invention this is achieved by providing a specially constructed head stall which is arranged to fit to the head of the animal and includes a shock unit which applies a shock to the animal when the unit is actuated.

This invention relates to a stock handling device comprising a shock unit adapted to be attached to the animal and means to cause a shock to deter the animal when it pushes against an object, characterised by a pressure switch 6, a shock unit 5, a plurality of contact pads (2,4) engageable on the animal in spaced relationship, and means connecting the contact pads (2,4) to the shock unit 5 whereby to apply a deterrent shock to the animal through the contact pads when the pressure switch 6 is actuated.

The present switch is preferably supported on a head stall together with the shock unit and a charge storage capacity.

In order however that the invention will be fully appreciated, embodiments thereof will now be described with reference to the accompanying drawings in which;

DETAILED DESCRIPTION OF THE INVENTION

Figure 1:
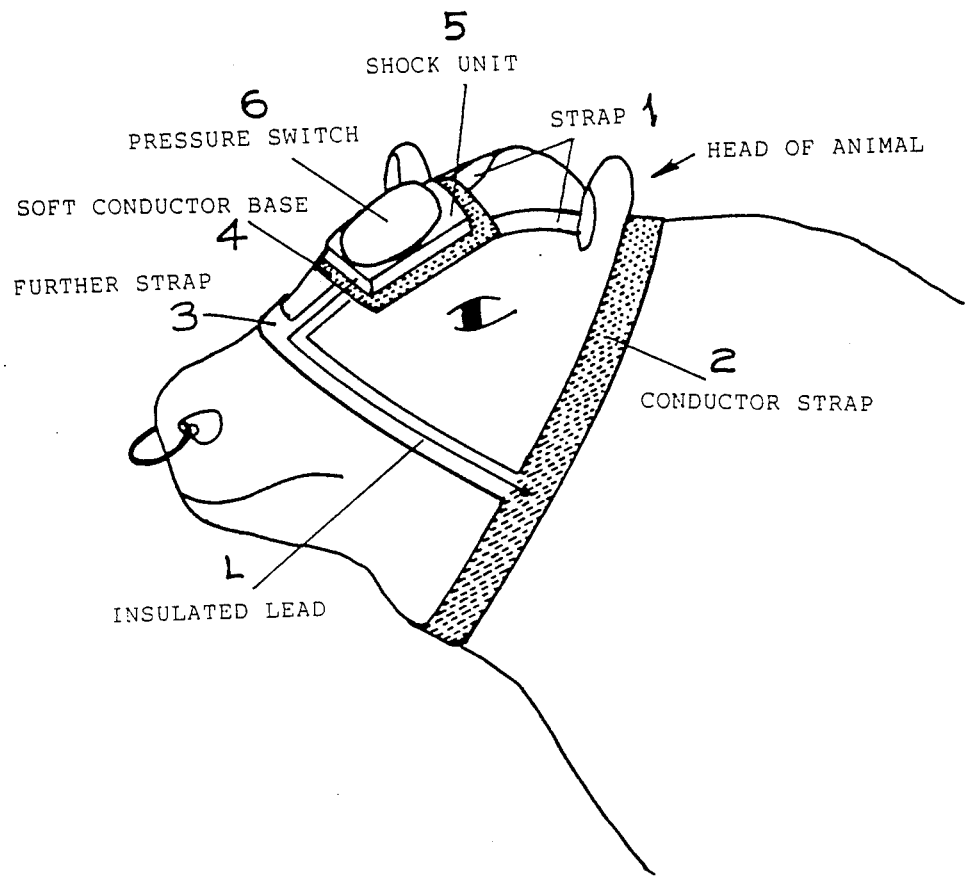
FIG. 1 is an elevation of the head of an animal showing a form of the invention thereon.

As shown in FIG. 1 the head stall comprises a Y-shaped strap 1 which in use extends from the central part of the front of the head of the animal upwardly and rearwardly to join on each side of a medial line to a contact pad or conductor strap 2 which fits around the neck of the animal, a further strap 3 extending around the forward part of the head of the animal and joining to the base of the Y-shaped strap 1, this carrying an insulated lead L.

Fitted to this Y-shaped strap 1 is a soft contact pad or conductor base 4 which engages the front of the head of the animal and this carries a shock unit 5 supplied by a battery or similar source with a sufficient voltage to apply a shock to the forehead of the animal through the soft contact pad 4 and the contact pad 2 to the animal, the contact pad 2 around the neck region of the animal directing the electrical flow to give the most effective shock for the purpose. The soft contact pad 4 and the contact pad 2 thus form spaced-apart electrodes to cause flow through the head of the animal.

Also carried by the Y-shaped strap 1 is a pressure switch 6 which is positioned at the front of the head of the animal and this pressure switch 6 is connected to the shock unit 5 to actuate the shock unit when the animal pushes its head against an object, thus applying a shock to the animal to discourage it from pushing further against the object.

The shock can arranged to temporarily stun the animal if this is desirable.

Thus a device is provided which, when the animal is involved in a fight with another animal or seeks to push its way through a fence or the like, will apply a shock to the animal as soon as the pressure switch is actuated by contact with the other animal or the fence or the like, the shock being arranged to be of sufficient magnitude to cause the animal to be temporarily stunned, or at least to desist from its action.

It will be realised that the contact pads 2 and 4 can be arranged in different ways as long as a path is provided to correctly apply the shock, the soft contact pad 4 and the contact pad 2 being electrically insulated from each other by the Y-shaped strap 1 and the further strap 3, which straps are themselves of insulating material.

It will also be realised that the assembly can be changed to support conductors at the appropriate positions in any other way, the principle of the invention being the application of the shock by means of an activating device initiated by the animal.

Figure 2:
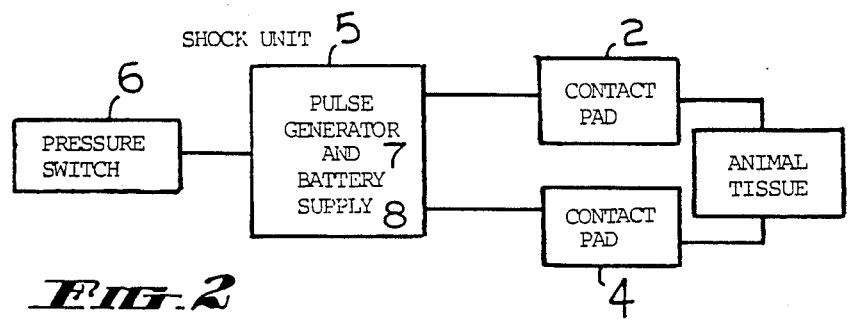
FIG. 2 is a block diagram depicting the invention.

In FIG. 2, the pressure switch 6 is shown mounted on the head stall to be positioned on the forehead of the subject animal and is normally open circuit until the animal applies pressure to the pressure switch and causes it to actuate the circuit to cause a pulse of electrical energy to discharge from the output of the pulse generator 7 with battery 8 of the shock unit 5 through the contact pads 2 and 4 and through the animal tissue between the said contact pads 2 and 4.

The contact pads 2 and 4 are situated in a suitable place on the subject animal to provide a shock which will act as a deterrent, and the pulse generator 7 and battery supply 8 are mounted on the head stall and form part of the shock unit 7.

The contact pads 2 and 4 are chosen to suit the impedance of the animal tissue whereby if the contact pads 2 and 4 are close together and a low impedance pertains then a medium voltage is utilized with low resistance contact pads 2 and 4, but if the contact pads 2 and 4 are far apart and a high impedance pertains then a high voltage pulse generator is utilised with high impedance and high resistance contact pads 2 and 4 utilised.

In FIG. 2 the block diagram shows how the pressure switch 6, which is the actuator for the device, is connected to the shock unit 5 which contains the pulse generator 7 and the battery supply 8, the contact pads 2 and 4 being shown connected to the shock unit 5 and across the animal tissue.

Figure 3:
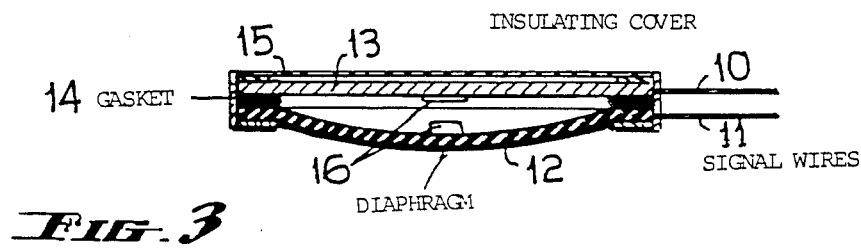
FIG. 3 is a sectional elevation of one form of pressure switch.

In FIG. 3 a pressure switch 6 is shown which has signal wires 10 and 11 bonded to the diaphragms 12 and 13 with the diaphragms being insulated from each other by an insulated gasket 14. An insulating plastic sheath 15 encapsulates the diaphragms 13 and 14 and ensures that electrical leakage between the diaphragms 12 and 13 is minimized. The diaphragm 12 is domed to project outwards when the pressure switch 6 is mounted on the forehead of an animal so that it can be depressed to actuate switch means 16 disposed between the diaphragm 12 and 13.

Figure 4:
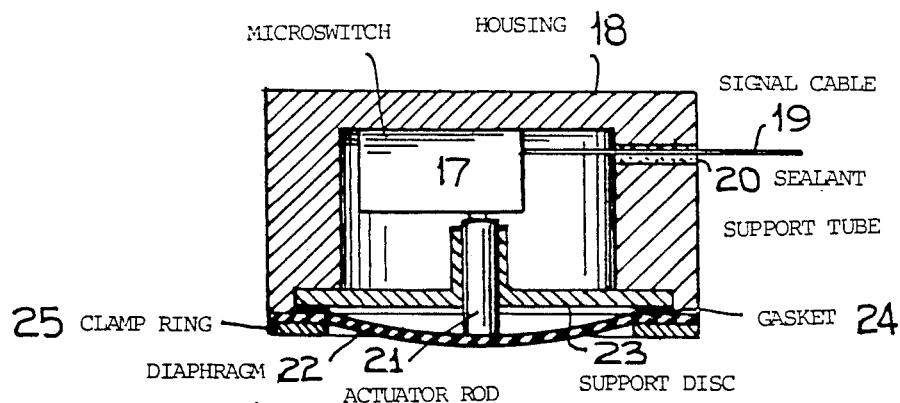
FIG. 4 is a sectional elevation of another form of pressure switch.

In FIG. 4 a sectional diagram is shown of a ruggedised pressure switch 6 capable of surviving the impacts that the subject animal may create. A small microswitch 17 is mounted in a housing 18 and the switch signal cable 19 is reticulated through a seal 20 to the pulse generator 7 of the shock unit 5. The switch 17 is actuated by a rod 21 and a spring diaphragm 22 when pressure is applied by the subject animal to the housing 18 and the diaphragm 22. The support disc 23 ensures that excessive overtravel cannot occur. The diaphragm 22 returns to its rest position on removal of the pressure. The gasket 24 ensures the switch 17 is in a sealed environment and the clamp ring 25 ensures that the diaphragm 22, gasket 24 and actuator rod system 21 are held in place.

Figure 5:
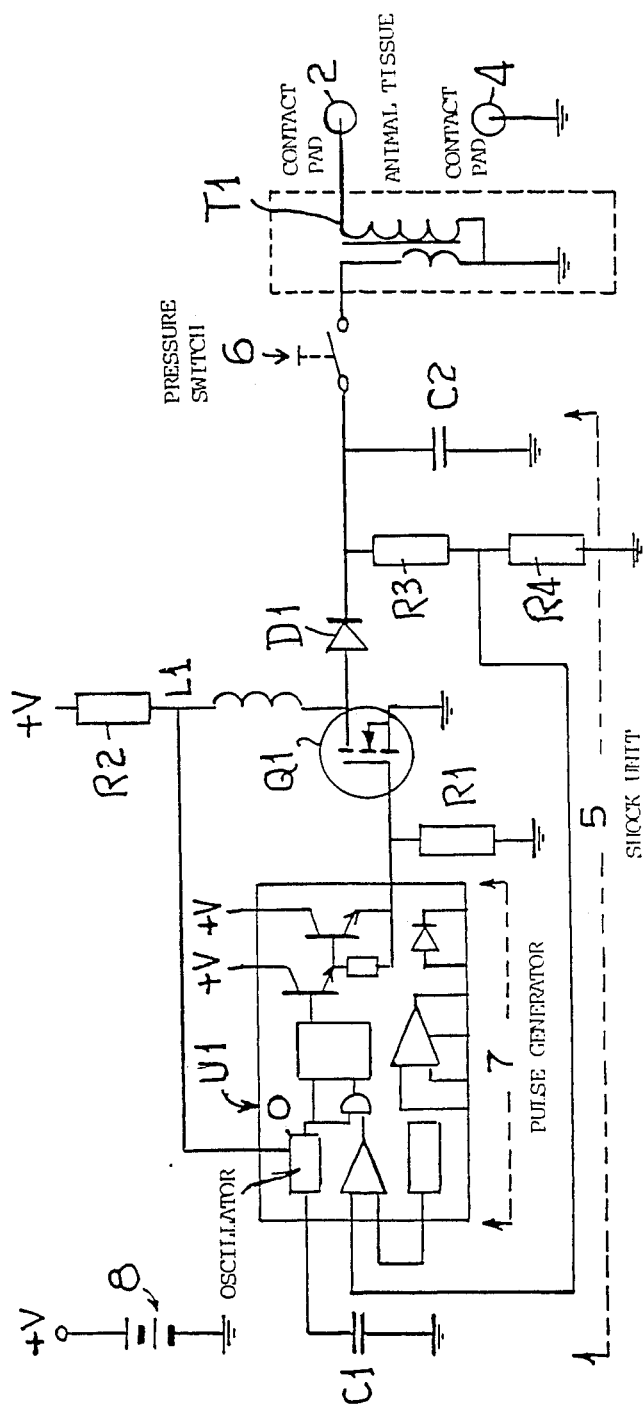
FIG. 5 shows a typical circuit diagram.

In FIG. 5 a circuit diagram is shown of the present invention. The battery 8 provides a voltage and current source which provides energy to operate the electronic unit U1.

U1 may be a commercially available Motorola integrated circuit type UA78S40.

The voltage developed across R2 is sensed by the electronic unit U1 and is used to modulate the switch Q1 and enable the maximum current fed to L1 to be limited. The resistor R1 ensures that the switch Q1 will turn off quickly by shunting any leakage currents from the electronic unit U1 to battery zero volt line. C1 sets the operational frequency of an oscillator 0 which is internal to the shock unit 5. The output of the unit is a rectangular wave of constant amplitude and variable mark space ratio. The mark space ratio is detemined by the voltage on the output capacitor C2 and the resistive attenuator R4 and R3. If the voltage across C2 is low and a chain of long pulses of battery voltage amplitude are low then a chain of long pulses of battery voltage amplitude are produced with intervening short periods of zero volts.

The long pulses of battery voltage amplitude are applied to the switch Q1 turning it ON and causing current to flow in L1 thereby charging L1. At the end of each long pulse the switch Q1 will turn off for the duration of the short period of zero voltage and the current flowing in the inductor will be commutated into the capacitor C2 by the action of the diode D1 thereby charging C2 which acts as a storage unit. This action will repeat until the voltage across C2 rises and is detected by the electronic unit U1 when the unit causes the mark space ratio to change and shorten the periods of battery voltage amplitude and lengthen the intervening periods of zero volts.

The energy transferred from L1 to C1 will thus decrease until the only energy transferred is equal to the loss rate of energy from the storage unit C2 and a constant voltage exists across the storage unit C2. Operation of the pressure switch 6 will discharge the energy stored in the storage unit C2 through the pads 2 and 4 and into the tissue of the animal.

The circuit diagram shown in FIG. 5 includes a transformer T1 which is inserted between the pressure switch 6 and the contact pads 2 and 4 in order to transform the output voltage of the circuit which is of the order of 200 to 500 volts to an output voltage of the order of 5 kV. The values of L1 and C2 are chosen in order that enough voltage will be present across the contact pads 2 and 4 to drive currents up to of the order of 200 mA through the animal tissue.

I claim:

1. A stock handling device comprising: a head stall for attaching to the head of an animal; a shock unit mounted on the head stall; a pressure switch mounted on the head stall to be activated when the animal pushes its head against an object; contact pads carried on the head stall for contacting the animal in a spaced apart relationship; means connecting the shock unit to the pressure switch and contact pads to apply a shock to the animal during use when the pressure switch is actuated; wherein the shock unit comprises an oscillator, a battery for energizing the oscillator, an output capacitor connected to the contact pads through the pressure switch for discharging through animal tissue when the switch is actuated, and circuit means receptive of the oscillator output for charging the output capacitor when the pressure switch is not actuated.

2. The device according to claim 1, wherein the contact pads include a first pad positioned to contact the forehead of the animal and a second pad positioned to contact the neck of the animal.

3. The device according to claim 2, wherein the head stall comprises a Y-shaped strap of insulating material and having ends joined to the second contact pad for contacting the neck of the animal, and wherein the Y-shaped strap carries the first contact pad for connecting the forehead of the animal also carries the shock unit and pressure switch.

4. The device according to claim 3, wherein the Y-shaped strap has a soft conductor base constituting the second contact pad and a top portion supporting the shock unit with the pressure switch thereon.

5. The device according to claim 1, wherein the pressure switch comprises a support, a domed diaphragm monuted on the support for inward movement from a rest position and a switch actuated by the diaphragm when moved inwardly when an animal pushes its head against an object.

6. A device according to claim 1, wherein the pressure switch comprises a hollow housing, an outwardly domed diaphragm mounted on the housing, a support disc closing the housing, a switch in the housing, and an actuating rod passing through the support disc and coupling the diaphragm to the switch to actuate the switch when the diaphragm is depressed.

7. The device according to claim 6, wherein the oscillator and circuit means comprises a pulse generator.

8. The device according to claim 1, wherein the output capacitor is connected directly across the contact pads.

9. The device according to claim 1, wherein the shock unit further comprises a voltage step-up transformer connected between the pressure switch and the contact pads.

10. A method of handling stock, comprising: applying a deterrent shock to an animal when the animal pushes against an object by mounting an actuatable-pressure switch and a shock unit including electrical storage means on the animal, disposing spaced apart contact pads on the animal and connecting the contact pads to the electrical storage means through the pressure switch, charging the electrical storage means when the pressure switch is not actuated and discharging the electrical storage means through tissue of the animal when the switch is actuated.

11. The method according to claim 10, further comprising disposing the pressure switch on a head stall fitted to the head of the animal to actuate the pressure switch when the animal pushes its head against an object.

* * * * *